(12) United States Patent
Saito et al.

(10) Patent No.: US 8,810,078 B2
(45) Date of Patent: Aug. 19, 2014

(54) ANALOG CURRENT OUTPUT CIRCUIT

(75) Inventors: Seiichi Saito, Tokyo (JP); Hirokazu Nomoto, Tokyo (JP); Yoshihiro Akeboshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 545 days.

(21) Appl. No.: 13/141,203

(22) PCT Filed: Dec. 26, 2008

(86) PCT No.: PCT/JP2008/073836
§ 371 (c)(1),
(2), (4) Date: Jun. 21, 2011

(87) PCT Pub. No.: WO2010/073401
PCT Pub. Date: Jul. 1, 2010

(65) Prior Publication Data
US 2011/0254527 A1    Oct. 20, 2011

(51) Int. Cl.
*H01H 9/54*    (2006.01)

(52) U.S. Cl.
USPC ............................................ 307/140

(58) Field of Classification Search
USPC ............................................ 307/140
See application file for complete search history.

(56) References Cited

U.S. PATENT DOCUMENTS

| 4,719,404 A | * | 1/1988 | Ekstrand | 323/297 |
| 2002/0121882 A1 | | 9/2002 | Matsuo et al. | |
| 2007/0279018 A1 | * | 12/2007 | Sumitomo et al. | 323/224 |

FOREIGN PATENT DOCUMENTS

| CN | 101056054 A | 10/2007 |
| JP | 09-160660 A | 6/1997 |
| JP | 11-41825 A | 2/1999 |
| JP | 2000-252754 A | 9/2000 |
| JP | 2002-320380 A | 10/2002 |
| JP | 2008-108119 A | 5/2008 |

OTHER PUBLICATIONS

Chinese Office Action, issued Jun. 5, 2013, Application No. 200880132531.9.
Japanese Office Action, dated Sep. 25, 2012.

* cited by examiner

*Primary Examiner* — Robert L. Deberadinis
(74) *Attorney, Agent, or Firm* — Sughrue Mion, PLLC

(57) ABSTRACT

In the analog current output circuit according to the present invention, a rising start position and a tilt of an internal control voltage are set such that it crosses, at the maximum of an analog output current, a load end voltage obtained when the resistance of a load is the one near the center of a specification range. According to a comparison result in a comparator, a switch causes a DC/DC converter to input a high reference voltage and causes an output transistor to output a high power supply voltage when the internal control voltage is smaller than the load end voltage and causes the DC/DC converter to input a low reference voltage and causes the output transistor to output a low power supply voltage when the internal control voltage is larger than the load end voltage.

11 Claims, 5 Drawing Sheets

ANALOG CURRENT OUTPUT CIRCUIT

CROSS REFERENCE TO RELATED APPLICATIONS

This application is a National Stage of International Application No. PCT/JP2008/073836 filed Dec. 26, 2011, the contents of all of which are incorporated herein by reference in their entirety.

TECHNICAL FIELD

The present invention relates to an analog current output circuit that supplies an analog current to a load (e.g., an electromagnetic valve or a current input amplifier), which is a control target in a control system.

BACKGROUND ART

As the control system, for example, if a water level control system that controls an in-tank water level configured by using a PLC (programmable logic controller) is taken as an example, the load as the control target is an electromagnetic valve that controls a flow rate of water. There are various types of electromagnetic valves. However, most of the types control opening and closing of the valve with an electric current of 4 to 20 milliamperes. In general, a specification range of the resistance of a current receiving section for 4 to 20 milliamperes provided in the electromagnetic valves is equal to or smaller than 600 ohms.

The analog current output circuit that supplies the analog current to the load has a configuration in which an output transistor and the load are arranged in series in this order between a power supply and the ground and a passing current of the output transistor is controlled such that an analog current coinciding with an output current command value flows to the load.

The resistance of the electromagnetic value serving as the load connected to the analog current output circuit is different according to a type of the electromagnetic valve within the specification range (e.g., 0 ohm to 600 ohms). Therefore, a voltage of power supplied to the analog current output circuit needs to be set to a sufficiently high voltage.

Therefore, when the resistance of the load is small and an analog output current is large, a power loss in the output transistor increases, and thus, internal heat generation of the output transistor due to the increase in this power loss has conventionally posed a serious problem.

To cope with the problem, for example, Patent Document 1 proposes a method of using a low-loss power supply of a switching type, continuously changing a power voltage of the power supply, and reducing a power loss in an output transistor. Specifically, in a technology disclosed in Patent Document 1, a step-down circuit of the switching type is used in the power supply, a potential difference between a voltage supplied to a collector of the output transistor from the step-down circuit and an output terminal, to which an emitter terminal is connected, is detected by an OP amplifier, and the potential difference is given to the step-down circuit of the switching type as a Ref voltage. Consequently, a collector-to-emitter voltage Vice of the output transistor is always kept at a fixed value of about +1 V to reduce power consumption of the output transistor.

Patent Document 1: Japanese Patent Application Laid-open No. 2000-252754

DISCLOSURE OF INVENTION

Problem to be Solved by the Invention

However, in the related art explained above, although it is taken into account to reduce a loss as much as possible by continuously changing a power supply voltage, when load resistance is high, an analog output current value is rapidly increased. Therefore, there is a problem in that, even if it is attempted to rapidly increase the voltage of the switching-type power supply connected to the collector of the output transistor, the increase in the power supply voltage does not catch up with the increase in the analog output current and the response of a current output is delayed.

The present invention has been devised in view of the above and it is an object of the present invention to obtain an analog current output circuit that can realize a reduction in a power loss that occurs when the resistance of a load connected to the analog current output circuit is small and realize securing of quick responsiveness performed when the resistance of the connected load is large.

Means for Solving Problem

In order to solve the aforementioned problems and attain the aforementioned object, an analog current output circuit according to one aspect of the present invention is constructed in such a manner that an output transistor and a load are connected in series between a power supply and a ground and that controls a passing current of the output transistor such that an analog output current to the load coincides with an output command current, wherein a voltage of the power supply is a first power supply voltage or a second power supply voltage lower than the first power supply voltage switched by a power supply voltage switching circuit, the power supply voltage switching circuit is configured to, according to a comparison result of a comparator that compares an internal control voltage and a load end voltage, select the first power supply voltage when the internal control voltage is smaller than the load end voltage and select the second power supply voltage when the internal control voltage is larger than the load end voltage, and the internal control voltage is generated by an internal control voltage generating circuit such that the internal control voltage is 0 volt from an analog output current 0 to a predetermined analog output current value and indicates a rightward-rising voltage track proportional to an electric current from the predetermined analog output current value to a maximum of the analog output current and crosses, at the maximum of the analog output current, a load end current generated when a resistance of the connected load is resistance near the center of a specification range.

Effect of the Invention

According to the present invention, the analog current output circuit adjusts, with reference to resistance near the center of a specification range of the resistance of the connected load, a circuit constant such that a voltage of the load at the time of an analog output maximum current value coincides with an output voltage of the internal control voltage generating circuit. Consequently, concerning a load having resistance smaller than the resistance near the center, the analog current output circuit acts to supply a high power supply voltage to the output transistor when the analog output current is small and supply a low power supply voltage to the output transistor when the analog output current is large and, on the other hand, concerning a load having resistance larger than the resistance near the center, always supply a high power supply voltage to the output transistor. Therefore, there is an effect that it is possible to reduce a power loss that occurs in the output transistor when the resistance of the connected load is small and secure quick responsiveness when the resistance of the connected load is large.

Figure 1:
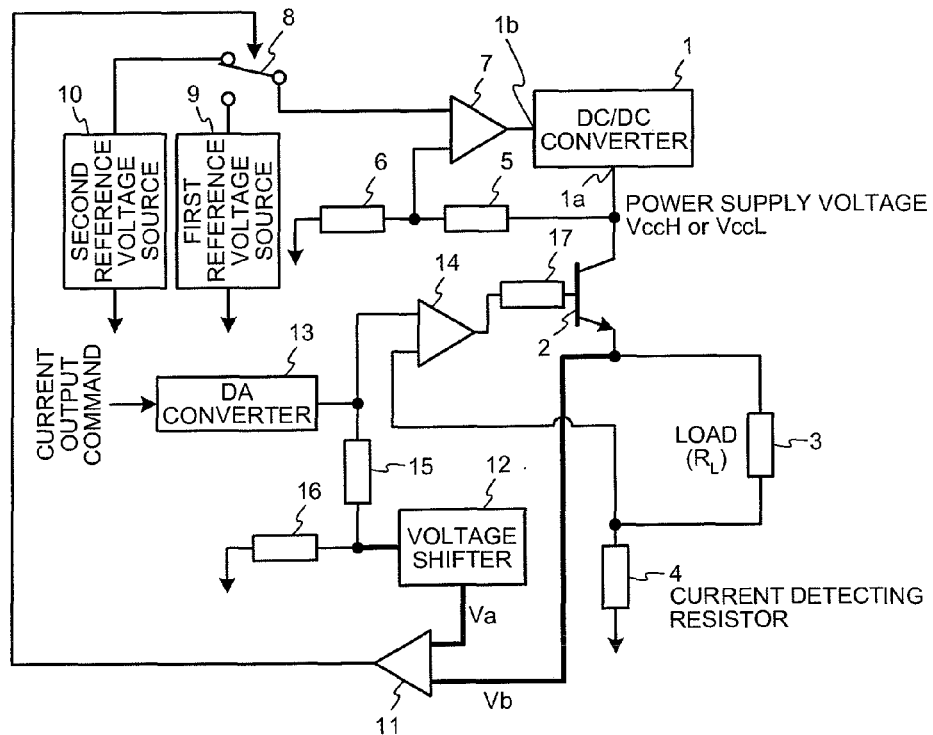
FIG. 1 is a block diagram of the configuration of an analog current output circuit according to a first embodiment of the present invention.

EXPLANATIONS OF LETTERS OR NUMERALS 1, 35, 40, 41, 44 DC/DC converters of a switching type
2 Output transistor
3 Load
4 Current detecting resistor
5, 6, 15, 16, 17, 26, 32 Resistors
7, 14 Operational amplifiers (OP amplifiers)
8, 36, 42 Switches (switching circuits)
9 First reference voltage source
10 Second reference voltage source
11 Comparator
12 Voltage shifter
13 DA converter
25, 47 Power supplies
27, 28 Zener diodes
29 Switching transistor (switching circuit)
31, 45 Voltage sources
37 Reference voltage source (another reference voltage source)
46 Volume Best Mode(S) For Carrying Out The Invention Preferred embodiments of an analog current output circuit according to the present invention are explained in detail below with reference to the drawings.

First Embodiment.

FIG. 1 is a block diagram of the configuration of an analog current output circuit according to a first embodiment of the present invention. As explained above, a power loss in an output transistor increases when the resistance of a load connected to the output transistor is small and an analog output current value is large. Therefore, the analog current output circuit according to the present invention is configured to be capable of reducing the power loss even in such a situation and, when the analog output current value is rapidly changed from the minimum to the maximum, quickly responding to the change irrespective of whether the resistance of the connected load is large or small.

In FIG. 1, the analog current output circuit includes a DC/DC converter 1 of a switching type as a power supply. An output transistor 2, a load (having resistance $R_L$) 3, and a current detecting resistor 4 are arranged in series in this order between a voltage output terminal 1a of the DC/DC converter 1 and the ground.

The load 3 has any resistance $R_L$ from 0 ohm to 600 ohms depending on a type of the load. The current detecting resistor 4 inserted between the load 3 and the ground is also connected to one input of an operational amplifier (hereinafter referred to as "OP amplifier") 14 such that a voltage generated in the current detecting resistor 4 is detected. However, an insertion position of this current detecting resistor 4 may be changed to a position between an emitter of the output transistor 2 and the load and connection of two inputs of the OP amplifier 14 may be changed to detect voltages at both ends of a current detector.

A voltage dividing circuit formed by series connection of resistors 5 and 6 is provided between a connection line, which connects the voltage output terminal 1a of the DC/DC converter 1 and a collector of the output transistor 2, and the ground. A connecting section of the resistors 5 and 6 is connected to one input terminal of an OP amplifier 7. The other input terminal of the OP amplifier 7 is connected to an output terminal of a switch 8 serving as a switching circuit. An output terminal of the OP amplifier 7 is connected to a reference voltage terminal 1b of the DC/DC converter 1.

One input terminal of the switch 8 is connected to a positive pole end of a first reference voltage source 9. The other input terminal of the switch 8 is connected to a positive pole end of a second reference voltage source 10. Switching of the switch 8 is controlled according to an output state of a comparator 11. Both of a negative pole end of the first reference voltage source 9 and a negative pole end of the second reference voltage source 10 are connected to the ground. The first reference voltage source 9 outputs a first reference voltage H. The second reference voltage source 10 outputs a second reference voltage L lower than the first reference voltage H. The switch 8, the first reference voltage source 9, and the second reference voltage source 10 as a whole configure a power supply voltage switching circuit.

One input terminal of the comparator 11 is connected to a connecting section (a load end) of the emitter of the output transistor 2 and the load 3. The other input terminal of the comparator 11 is connected to an output terminal of a voltage shifter 12.

An output terminal of a DA converter 13, to which a current output command is input from the outside, is connected to one input terminal of the OP amplifier 14 and connected to the ground via a voltage dividing circuit formed by series connection of resistors 15 and 16. A connecting section of the resistors 15 and 16 is connected to an input terminal of the voltage shifter 12. The voltage dividing circuit formed by the resistors 15 and 16 and the voltage shifter 12 as a whole configure an internal control voltage generating circuit.

The other input terminal of the OP amplifier 14 is connected to a connecting section of the load 3 and the current detecting resistor 4. An output terminal of the OP amplifier 14 is connected to a base of the output transistor 2 via a resistor 17.

In the configuration explained above, the analog current output circuit according to the present invention performs operations explained below. The DA converter 13 converts a digital value of a current output command input from the outside into an output command analog voltage and outputs the output command analog voltage. The OP amplifier 14 supplies a current corresponding to a difference between the output command analog voltage received from the DA converter 13 and an output voltage corresponding to an analog output current to the load 3 detected by the current detecting resistor 4 to the base of the output transistor 2 via the resistor 17. The OP amplifier 14 controls a passing current of the output transistor 2 such that an analog current matching a command value of the current output command can be stably output to the load.

In this first embodiment, the DC/DC converter 1 is a power supply that can switch and generate, according to the magnitude of a reference voltage supplied from the outside to the reference voltage terminal 1b, a power supply voltage VccH as a first power supply voltage and a power supply voltage VccH as a second power supply voltage lower than the power supply voltage VccH.

Specifically, when the switch 8 selects the first reference voltage source 9, the DC/DC converter 1 generates, based on the first reference voltage H input via the OP amplifier 7, the power supply voltage VccH. When the switch 8 selects the second reference voltage source 10, the DC/DC converter 1 generates, based on the second reference voltage L input via the OP amplifier 7, the power supply voltage VccL.

The power supply voltage VccH or the power supply voltage VccL generated in this way is stably supplied from the voltage output terminal 1a to the collector of the output transistor 2 according to an action of a feedback circuit formed by the voltage dividing circuit (the resistors 5 and 6) and the OP amplifier 7.

The comparator 11 compares a magnitude relation between an internal control voltage Va output by the voltage shifter 12 and a load end voltage Vb appearing in a connecting section (a load end) of an emitter terminal of the output transistor 2 and the load 3. The comparator 11 outputs, to the switch 8, a control signal for causing the switch 8 to select the first reference voltage source 9 in the case of Va≤Vb and causing the switch 8 to select the second reference voltage source 10 in the case of Va>Vb.

Consequently, in the DC/DC converter 1, switching of a power supply voltage is performed to supply the high power supply voltage VccH to the collector of the output transistor 2 when a comparison result in the comparator 11 is Va≤Vb and supply the low power supply voltage VccL to the collector of the output transistor 2 when the comparison result is Va>Vb.

The output command analog voltage output by the DA converter 13 is obtained by subjecting the digital value of the current output command to voltage conversion. Therefore, a divided voltage obtained by dividing the output command analog voltage output by the DA converter 13 in the voltage dividing circuit formed by the resistors 15 and 16, which divides the output command analog voltage, is a voltage signal that indicates a change of a rightward-rising linear track according to an increase in an output command current (an analog output current) starting from the output command current (the analog output current)=0.

The voltage shifter 12 performs subtraction from the divided voltage in the voltage dividing circuit to continuously output 0 volt in a period in which the analog output current supplied to the load 3 reaches from 0 to a predetermined analog current value 18 (see FIG. 2) and directly output the divided voltage input from the voltage dividing circuit after the analog output current reaches the predetermined analog current value 18. Consequently, the internal control voltage Va output by the voltage shifter 12 is a voltage signal that is 0 volt from the output current=0 to the predetermined analog current value 18 and indicates a change along a rightward-rising linear track proportional to the analog output current after the predetermined analog current value 18.

On the other hand, the load end voltage Vb is a voltage signal indicating a change of a rightward-rising linear track, which is represented by a product of the analog output current and the load resistance, according to an increase in the analog output current starting from the analog output current=0.

Operations including operations of the voltage shifter 12, the comparator 11, and the switch 8 are specifically explained below with reference to FIG. 2.

Figure 2:
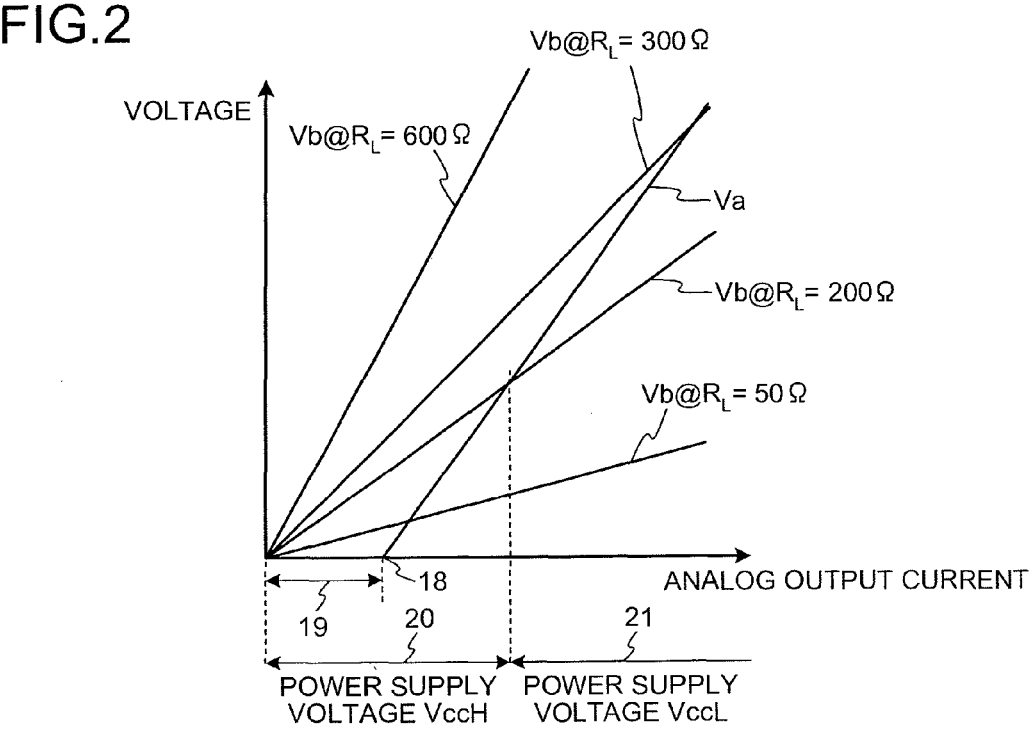
FIG. 2 is a characteristic chart for explaining a switching operation of a power supply voltage.

FIG. 2 is a characteristic chart for explaining switching of a power supply voltage. In FIG. 2, the abscissa represents an analog output current and the ordinate represents a voltage. In FIG. 2, rightward-rising linear tracks of the load end voltage Vb generated when the resistance $R_L$ of the connected load 3 is 600 ohms, 300 ohms, 200 ohms, and 50 ohms and an example of a polygonal line of the internal control voltage Va are shown.

An analog output current range 19 in which the internal control voltage Va is 0 volt is an analog output current range in which the voltage shifter 12 shifts a divided voltage to 0 volt. The internal control voltage Va indicates a change along a rightward-rising linear track according to an increase in the analog output current from the analog output current range 19 in which the divided voltage is shifted. In FIG. 2, a rightward-rising linear track of the internal control voltage Va crosses linear tracks of the load end voltage Vb at the resistance $R_L$ of 50 ohms, 200 ohms, and 300 ohms in this order, wherein it crosses, at a maximum of the analog output current, a linear track of the load end voltage Vb at the resistance $R_L$ of 300 ohms, whereas it never crosses a linear track of the load end voltage Vb at the resistance $R_L$ of 600 ohms.

In this embodiment, a rising start position and a tilt of the internal control voltage Va are set such that the internal control voltage Va crosses the load end voltage Vb at the maximum of the analog output current when the resistance $R_L$ of the load 3 is a resistance near the center of a specification range of the resistance $R_L$. In this example, because the specification range of the resistance $R_L$ is $R_L$=Ω to $R_L$=600 Ω, the load end voltage Vb that the internal control voltage Va crosses at the maximum analog current value is obtained when the load 3 having $R_L$=300 Ω is connected. Therefore, in FIG. 2, a state in which the linear track of the load end voltage Vb at the resistance $R_L$ of 300 ohms and the polygonal line track of the internal control voltage Va cross at the maximum of the analog output current is shown.

The comparator 11 compares a magnitude relation between the internal control voltage Va and the load end voltage Vb. Therefore, in this embodiment, for example, switching of the power supply voltage shown in FIG. 2 is performed.

In FIG. 2, for example, when the resistance $R_L$ of the load 3 is 200 ohms, in a period 20 in which Va≤Vb, because the switch 8 selects the reference voltage source 9, the high power supply voltage VccH is used. In a period 21 in which Va>Vb, because the switch 8 selects the reference voltage source 10, the low power supply voltage VccL is used. When the resistance $R_L$ of the load 3 is smaller resistance of 50 ohms, the same switching of the power supply voltage is performed. On the other hand, when the resistance $R_L$ of the load 3 is 600 ohms, the magnitude relation between the internal control voltage Va and the load end voltage Vb is always Va<Vb and the switch 8 continues to select the reference voltage source 9. Therefore, the switching of the power supply voltage is not performed and the high power supply voltage VccH is always used.

In short, in FIG. 2, in the case of $R_L$<300 Ω, when the analog output current is small, the magnitude relation between the internal control voltage Va and the load end voltage Vb is Va≤Vb and the high power supply voltage VccH is used and, when the analog output current increases, the magnitude relation between the internal control voltage Va and the load end voltage Vb is Va>Vb and the power supply voltage is switched to the low power supply voltage VccL. On the other hand, in the case of $R_L$≥300 Ω, the magnitude relation between the internal control voltage Va and the load end voltage Vb is always Va≤Vb and the high power supply voltage VccH is used irrespective of whether the analog output current is small or large.

If the resistance of the current detecting resistor 4 is negligibly small, the collector-to-emitter voltage Vce of the output transistor 2 is represented as Vce=Vcc−$I_0$×$R_L$ using a power supply voltage Vcc, an analog output current $I_0$, and the load resistance $R_L$. A heat value (a power loss) W of the output transistor 2 is represented as W=Vce×$I_0$.

Specifically, when the resistance $R_L$ of the load 3 is small, irrespective of whether the power supply voltage Vcc is the high power supply voltage VccH or the low power supply voltage VccL, the power supply voltage Vcc does not adversely affect the operation of the analog current output circuit. However, when the load resistance $R_L$ is small and the analog output current $I_0$ is large, the collector-to-emitter voltage Vce is smaller if the low power supply voltage VccL is used as the power supply voltage Vcc than if the high power supply voltage VccH is used.

Therefore, in this embodiment, as shown in FIG. 2, in the case or $R_L$<300 Ω, when the analog output current is small, the high power supply voltage VccH is used and, when the analog output current increases, the power supply voltage is switched to the low power supply voltage VccL. Therefore, the heat value (the power loss) W of the output transistor 2, which poses a problem when the load resistance $R_L$ is small and the analog output current $I_0$ is large, can be reduced.

When the resistance $R_L$ of the load 3 is large, the power supply voltage Vcc always has to be the high power supply voltage VccH, wherein, as shown in FIG. 2, in the case of $R_L$≥300 Ω, the high power supply voltage VccH is always used.

Therefore, when the resistance $R_L$ of the load 3 is large, even if a current output command input to the DA converter 13 from the outside suddenly changes from a value 0 to a value MAX at a time, as the power supply voltage Vcc, the high power supply voltage VccH is applied from the beginning. Therefore, no problem occurs in a follow-up ability.

Figure 3:
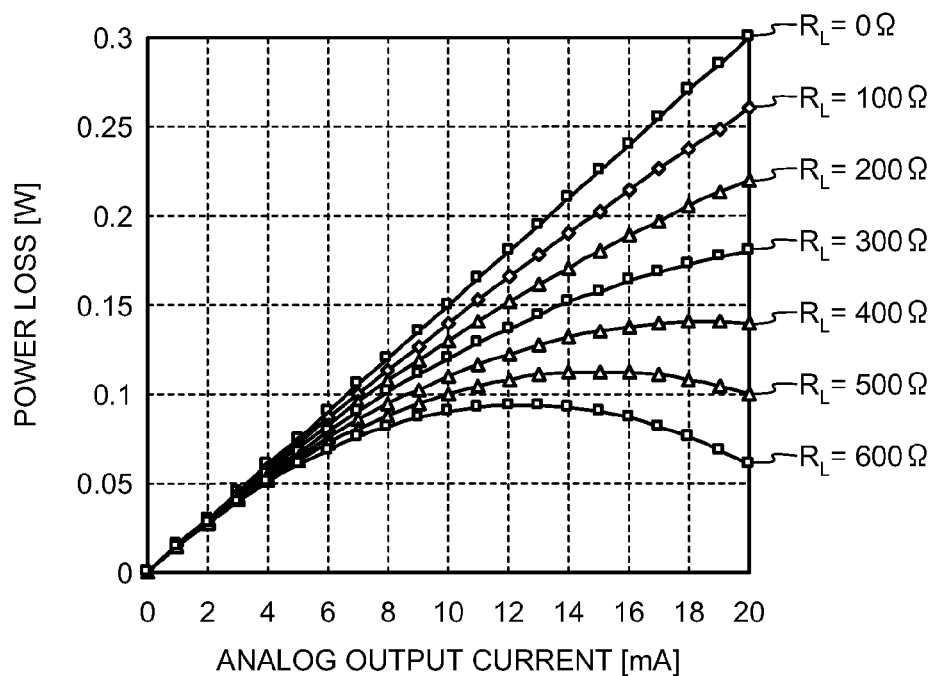
FIG. 3 is a graph of one characteristic example of a power loss that occurs when the switching of a power supply voltage is not performed.
Figure 4:
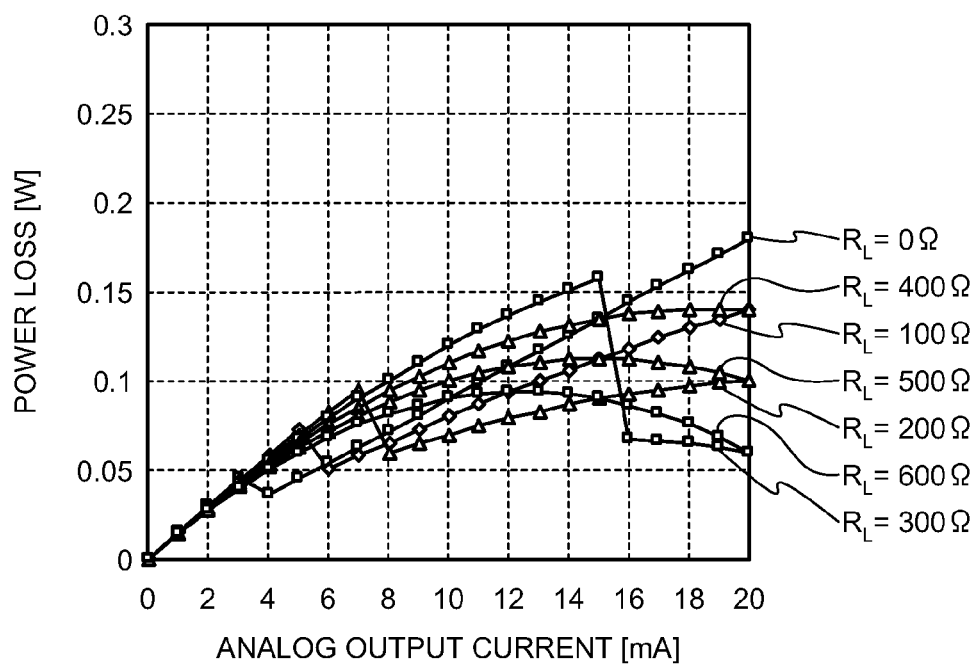
FIG. 4 is a graph of one characteristic example of a power loss that occurs when switching of a power supply voltage according to the present invention is performed.

FIG. 3 is a graph of one characteristic example of a power loss that occurs when switching of a power supply voltage is not performed. FIG. 4 is a graph of one characteristic example of a power loss that occurs when the switching of the power supply voltage according to the present invention is performed. In FIGS. 3 and 4, a relation between power supply losses that occur when the resistance $R_L$ of the connected load 3 is 0 ohm, 100 ohms, 200 ohms, 300 ohms, 400 ohms, 500 ohms, and 600 ohms and an analog output current is shown. In FIG. 4, a boundary between the power loss that occurs when the switching of the power supply voltage is performed and the power loss that occurs when the switching of the power supply voltage is not performed is set in the middle of 300 ohms and 400 ohms of the resistance $R_L$.

In FIGS. 3 and 4, it is seen that, for example, when the resistance $R_L$ of the connected load 3 is 0 ohm and a maximum analog output current (20 mA) is flowing, a power loss of 0.3 watt that occurs when the switching of the power supply voltage is not performed is reduced to a power loss of 0.17 watt if the switching of the power supply voltage is performed by the method explained above. In this way, when the resistance $R_L$ of the connected load 3 is small resistance equal to or smaller than 300 ohms, because the switching of the power supply voltage is performed, the power loss that poses a problem when the analog output current increases is reduced.

As explained above, according to the first embodiment, the analog current output circuit adjusts, with reference to resistance near the center of a specification range of the resistance of the connected load, a circuit constant such that a voltage of the load at the time of an analog output maximum current value coincides with an output voltage of the internal control voltage generating circuit. Consequently, concerning a load having resistance smaller than the resistance near the center, the analog current output circuit supplies a high power supply voltage to the output transistor when the analog output current is small and supply a low power supply voltage to the output transistor when the analog output current is large and, on the other hand, concerning a load having resistance larger than the resistance near the center, always supplies a high power supply voltage to the output transistor.

Therefore, when the resistance of the connected load is small, a power supply voltage supplied to the output transistor when the analog output current is large is a low voltage and it is possible to reduce a power loss that occurs in the output transistor. Further, because a proper operation is performed even at the low power supply voltage, it is possible to secure quick responsiveness. When the resistance of the connected load is large, even if the power supply voltage supplied to the output transistor is always a high voltage, a power loss that occurs in the output transistor is small and the high voltage is always supplied. Therefore, it is possible to secure quick responsiveness.

In the following explanation, modifications of the power supply switching circuit are explained as second to fifth embodiments and modifications of the method of generating the internal control voltage Va are explained as sixth and seventh embodiments.

Second Embodiment.

Figure 5:
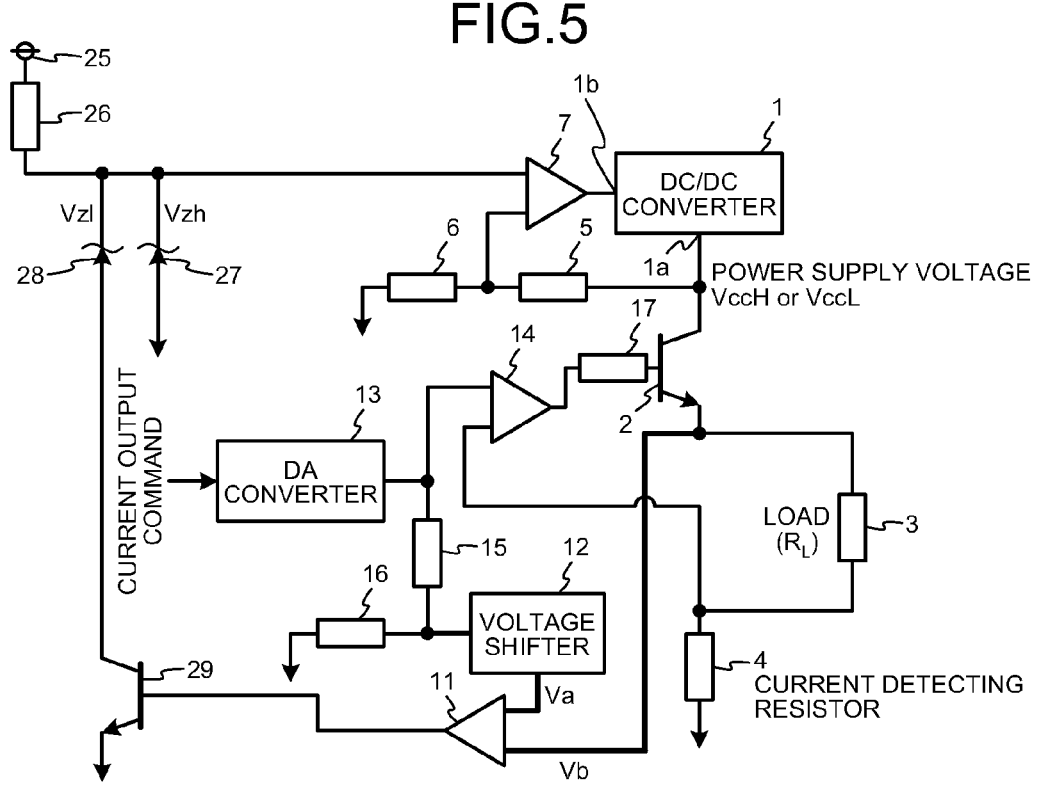
FIG. 5 is a block diagram of the configuration of an analog current output circuit according to a second embodiment of the present invention.

FIG. 5 is a block diagram of the configuration of an analog current output circuit according to a second embodiment of the present invention. In FIG. 5, components same as or equivalent to the components shown in FIG. 1 (the first embodiment) are denoted by the same reference numerals and signs. Sections related to this second embodiment are mainly explained below.

As shown in FIG. 5, in the analog current output circuit according to this second embodiment, in the configuration shown in FIG. 1 (the first embodiment), a power supply voltage switching circuit (a power supply 25, a resistor 26, zener diodes 27 and 28, and a switching transistor 29 serving as a switching circuit) is provided instead of the power supply voltage switching circuit (the switch 8 and the reference voltage sources 9 and 10).

Cathodes of the zener diodes 27 and 28 are connected to the power supply 25 via the resistor 26 in parallel and connected to the other input terminal of the OP amplifier 7. An anode of the zener diode 27 is connected to the ground. An anode of the zener diode 28 is connected to a collector of the switching transistor 29. A base of the switching transistor 29 is connected to an output terminal of the comparator 11. An emitter of the switching transistor 29 is connected to the ground.

A zener voltage Vzh of the zener diode 27 is the first reference voltage H. A zener voltage Vzl of the zener diode 28 is the second reference voltage L. Therefore, the voltage of the power supply 25 is a voltage higher than the zener voltage Vzh.

In the configuration explained above, when a magnitude relation between the input internal control voltage Va and the load end voltage Vb is Va≥Vb, the comparator 11 sets an output level to a low level. Consequently, because the transistor 29 maintains an OFF operation state, the zener voltage Vzh (the first reference voltage H) of the zener diode 27 is input to the reference voltage terminal 1b of the DC/DC converter 1 via the OP amplifier 7 and the power supply voltage VccH is output from the voltage output terminal 1a of the DC/DC converter 1.

When the magnitude relation between the input internal control voltage Va and the load end voltage Vb is Va>Vb, the comparator 11 sets the output level to a high level. Consequently, because the transistor 29 changes to an ON operation state, an electric current flows to the zener diode 27, the zener voltage Vzl (the second reference voltage L) is input to the reference voltage terminal 1b of the DC/DC converter 1 via the OP amplifier 7, and the power supply voltage VccL is output from the voltage output terminal 1a of the DC/DC converter 1.

Therefore, according to the second embodiment, as in the first embodiment, it is possible to switch the high power supply voltage VccH and the low power supply voltage VccL corresponding to the resistance $R_L$ of the connected load 3 and supply the power supply voltage to the output transistor 2.

Third Embodiment.

Figure 6:
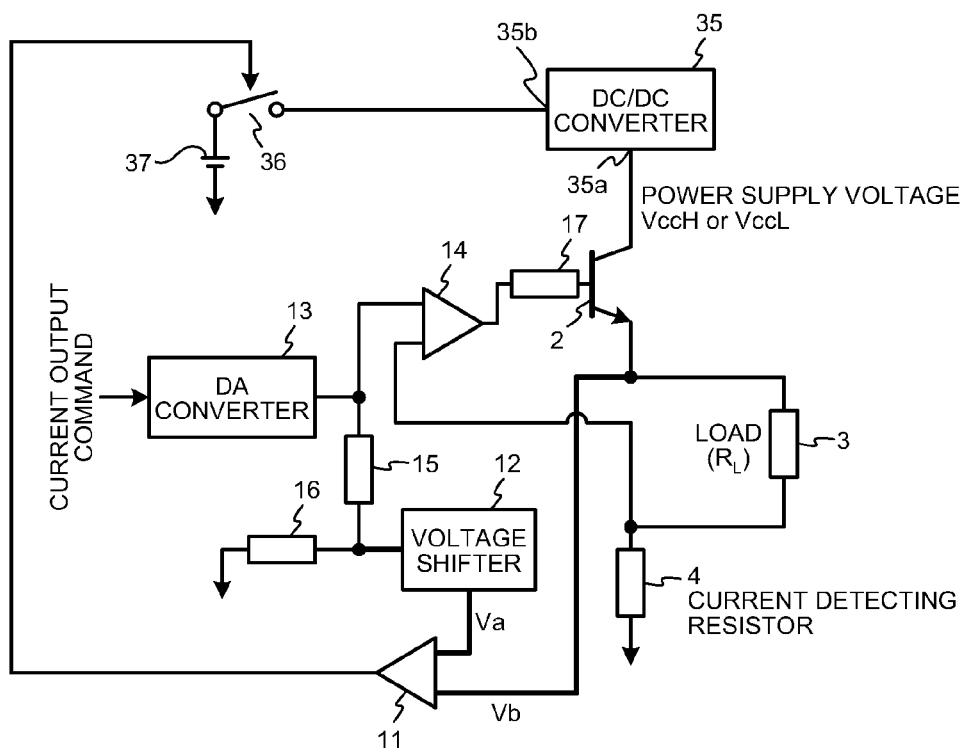
FIG. 6 is a block diagram of the configuration of an analog current output circuit according to a third embodiment of the present invention.

FIG. 6 is a block diagram of the configuration of an analog current output circuit according to a third embodiment of the present invention. In FIG. 6, components same as or equivalent to the components shown in FIG. 1 (the first embodiment) are denoted by the same reference numerals and signs. Sections related to this third embodiment are mainly explained below.

As shown in FIG. 6, in the analog current output circuit according to this third embodiment, in the configuration shown in FIG. 1 (the first embodiment), a power supply (a DC/DC converter 35) is provided instead of the power supply (the DC/DC converter 1) and a power supply voltage switching circuit (a reference voltage source 37 that outputs another reference voltage and a switch 36 serving as a switching circuit) is provided instead of the power supply voltage switching circuit (the switch 8 and the reference voltage sources 9 and 10).

One terminal of the switch 36 is connected to a reference voltage terminal 35b of the DC/DC converter 35. The other terminal of the switch 36 is connected to a positive pole end of the reference voltage source 37. A negative pole end of the reference voltage source 37 is connected to the ground. The reference voltage source 37 outputs a predetermined reference voltage.

The DC/DC converter 35 of a switching type includes therein a reference voltage source that outputs the second reference voltage L. When a reference voltage is not supplied to the reference voltage terminal 35b from the outside, the DC/DC converter 35 generates the power supply voltage VccL using the incorporated reference voltage source and outputs the power supply voltage VccL from a voltage output terminal 35a to the collector of the output transistor 2.

When a reference voltage is supplied to the reference voltage terminal 35b from the outside, the DC/DC converter 35 generates the power supply voltage VccH using the first reference voltage H obtained by adding the reference voltage from the outside to the second reference voltage L and outputs the power supply voltage VccH from the voltage output terminal 35a to the collector of the output transistor 2.

The switch 36 is in a closed state when the comparator 11 determines as a result of comparison that a magnitude relation between the internal control voltage Va and the load end voltage Vb is Va≤Vb. The switch 36 connects the positive pole end of the reference voltage source 37 to the reference voltage terminal 35b of the DC/DC converter 35. The switch 36 is in an open state when the comparator 11 determines as a result of comparison that a magnitude relation between the internal control voltage Va and the load end voltage Vb is Va>Vb. The switch 36 disconnects the positive pole end of the reference voltage source 37 from the reference voltage terminal 35b of the DC/DC converter 35.

Therefore, according to the third embodiment, as in the first embodiment, it is possible to switch the high power supply voltage VccH and the low power supply voltage VccL corresponding to the resistance $R_L$ of the connected load 3 and supply the power supply voltage to the output transistor 2.

Fourth Embodiment.

Figure 7:
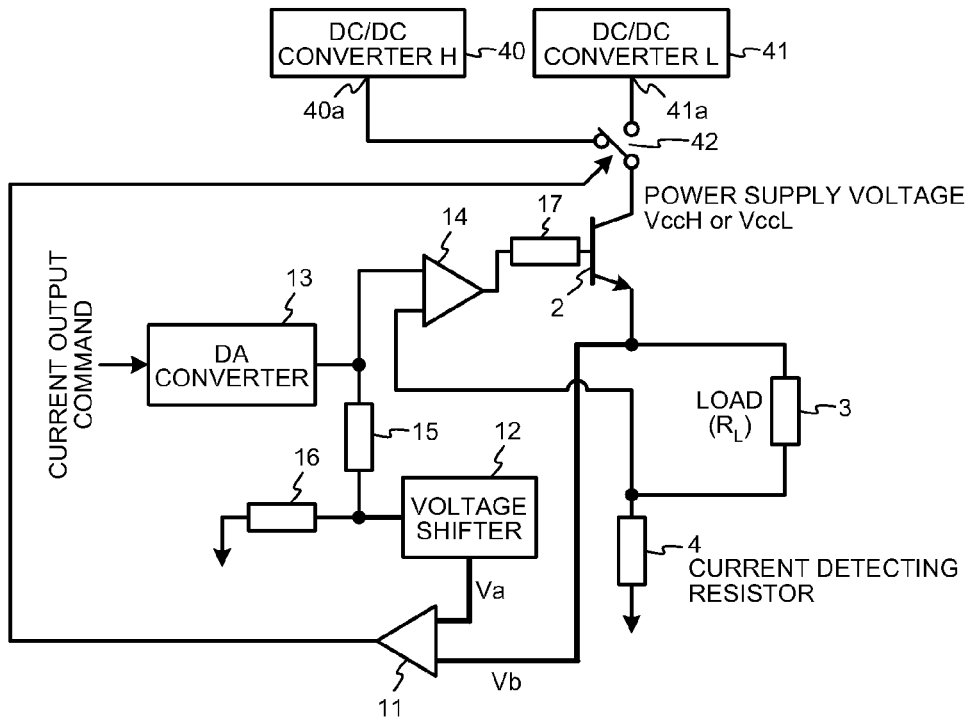
FIG. 7 is a block diagram of the configuration of an analog current output circuit according to a fourth embodiment of the present invention.

FIG. 7 is a block diagram of the configuration of an analog current output circuit according to a fourth embodiment of the present invention. In FIG. 7, components same as or equivalent to the components shown in FIG. 1 (the first embodiment) are denoted by the same reference numerals and signs. Sections related to this fourth embodiment are mainly explained below.

As shown in FIG. 7, in the analog current output circuit according to this fourth embodiment, in the configuration shown in FIG. 1 (the first embodiment), a power supply (a DC/DC converter H 40 and a DC/DC converter L 41) is provided instead of the power supply (the DC/DC converter 1) and a power supply voltage switching circuit (a switch 42 serving as a switching circuit) is provided instead of the power supply voltage switching circuit (the switch 8 and the reference voltage sources 9 and 10).

The DC/DC converter H 40 of a switching type includes therein a reference voltage source that outputs the first reference voltage H. The DC/DC converter H 40 generates the power supply voltage VccH using the incorporated reference voltage source. The DC/DC converter L 41 of the switching type includes therein a reference voltage source that outputs the second reference voltage L. The DC/DC converter L 41 generates the power supply voltage VccL using the incorporated reference voltage source.

When the comparator 11, determines as a result of comparison that a magnitude relation between the internal control voltage Va and the load end voltage Vb is Va≤Vb, the switch 42 selects a voltage (the power supply voltage VccH) output to a voltage output terminal 40a by the DC/DC converter H 40 and outputs the voltage to the collector of the output transistor 2.

When the comparator 11 determines as a result of comparison that a magnitude relation between the internal control voltage Va and the load end voltage Vb is Va>Vb, the switch 42 selects a voltage (the power supply voltage VccL) output to the voltage output terminal 41a by the DC/DC converter L 41 and outputs the voltage to the collector of the output transistor 2.

Therefore, according to the fourth embodiment, as in the first embodiment, it is possible to switch the high power supply voltage VccH and the low power supply voltage VccL corresponding to the resistance $R_L$ of the connected load 3 and supply the power supply voltage to the output transistor 2.

Fifth Embodiments.

Figure 8:
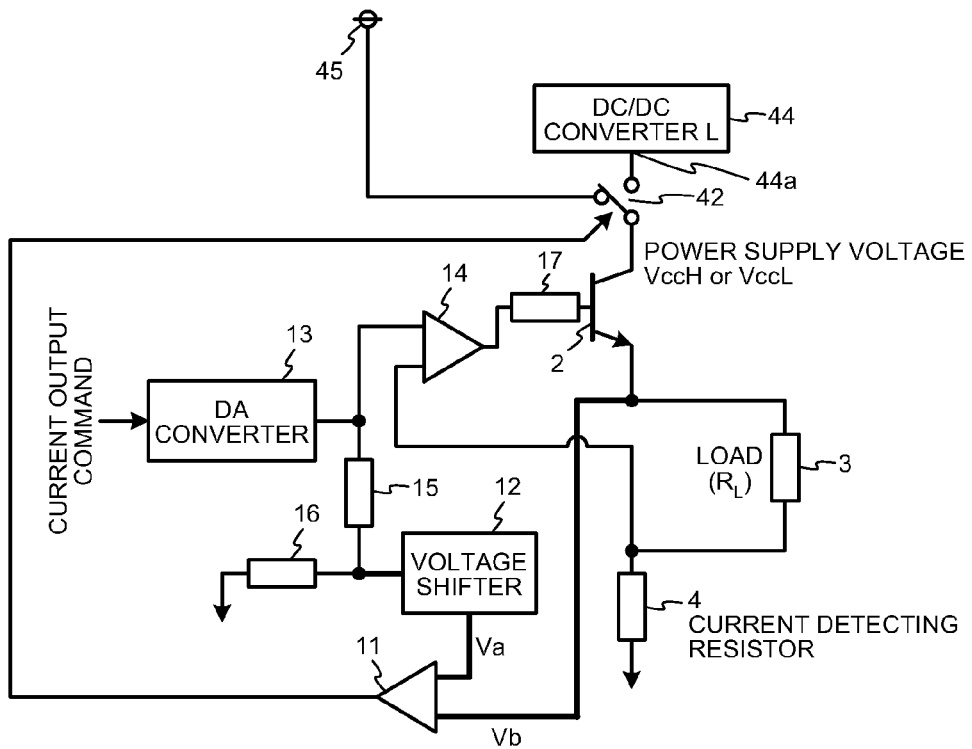
FIG. 8 is a block diagram of the configuration of an analog current output circuit according to a fifth embodiment of the present invention.

FIG. 8 is a block diagram of the configuration of an analog current output circuit according to a fifth embodiment of the present invention. In FIG. 8, components same as or equivalent to the components shown in FIG. 7 (the fourth embodiment) are denoted by the same reference numerals and signs. Sections related to this fifth embodiment are mainly explained below.

As shown in FIG. 8, in the analog current output circuit according to this fifth embodiment, in the configuration shown in FIG. 7 (the fourth embodiment), a power supply (a voltage source 45 and a DC/DC converter L 44) is provided instead of the power supply (the DC/DC converter H 40 and the DC/DC converter L 41).

The voltage source 45 outputs the power supply voltage VccH to one input terminal of the switch 42. The DC/DC converter L 44 of a switching type generates, based on a voltage of a reference voltage source incorporated therein, the power supply voltage VccL and outputs the power supply voltage VccL to the other input terminal of the switch 42.

When the comparator 11, determines as a result of comparison that a magnitude relation between the internal control voltage Va and the load end voltage Vb is Va≤Vb, the switch 42 selects an output voltage (the power supply voltage VccH) of the voltage source 45 and outputs the output voltage to the collector of the output transistor 2.

When the comparator 11 determines as a result of comparison that a magnitude relation between the internal control voltage Va and the load end voltage Vb is Va>Vb, the switch 42 selects a voltage (the power supply voltage VccL) output to the voltage output terminal 44_a_ by the DC/DC converter L 44 and outputs the voltage to the collector of the output transistor 2.

Therefore, according to the fifth embodiment, as in the first embodiment, it is possible to switch the high power supply voltage VccH and the low power supply voltage VccL corresponding to the resistance $R_L$ of the connected load 3 and supply the power supply voltage to the output transistor 2.

Sixth Embodiment.

Figure 9:
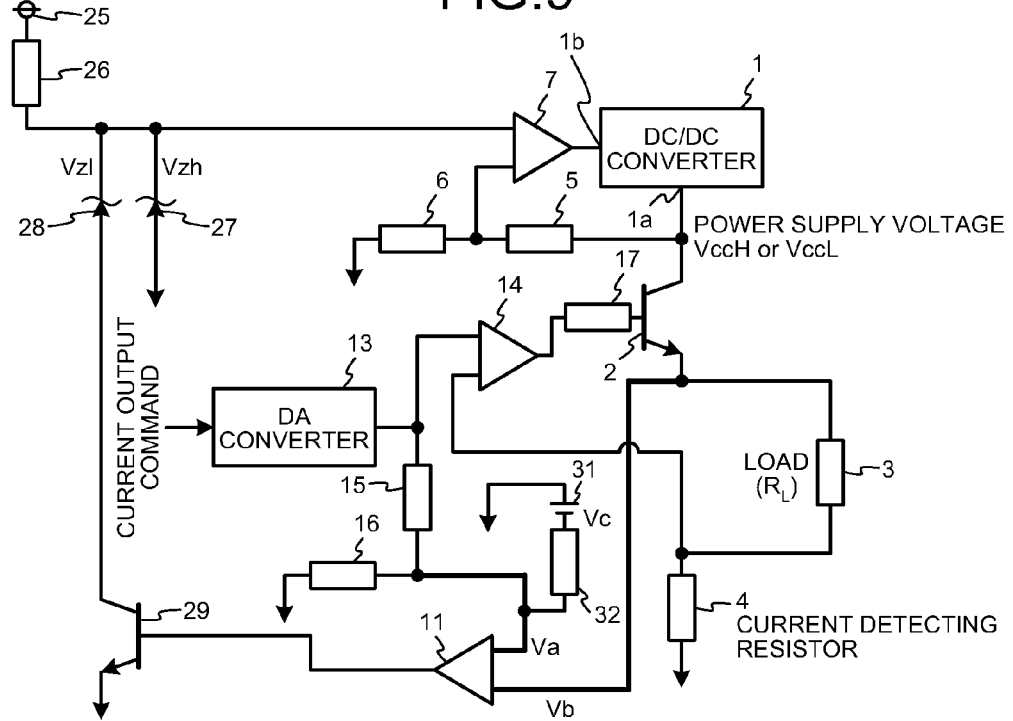
FIG. 9 is a block diagram of the configuration of an analog current output circuit according to a sixth embodiment of the present invention.

FIG. 9 is a block diagram of the configuration of an analog current output circuit according to a sixth embodiment of the present invention. In FIG. 9, components same as or equivalent to the components shown in FIG. 5 (the second embodiment) are denoted by the same reference numerals and signs. Sections related to this sixth embodiment are mainly explained below.

As shown in FIG. 9, in the analog current output circuit according to this sixth embodiment, in the configuration shown in FIG. 5 (the second embodiment), a voltage source 31 for an output voltage Vc and a resistor 32 are provided instead of the voltage shifter 12 in the internal control voltage generating circuit (the voltage divider formed by the resistors 15 and 16 and the voltage shifter 12).

A divided voltage output end of the voltage dividing circuit (the resistors 15 and 16) is directly connected to the other input terminal of the comparator 11. A positive pole end of the voltage source 31 is connected to the ground. A negative pole end of the voltage source 31 is connected to the other input terminal of the comparator 11 via the resistor 32.

The voltage dividing circuit (the resistors 15 and 16) divides an output of the DA converter 13 according to a voltage division ratio of the resistors 15 and 16. As explained above, a divided voltage of the voltage dividing circuit indicates a change of a rightward-rising linear track according to an increase in an analog output current starting from the analog output current=0. The voltage source 31 and the resistor 32 are components for realizing the function of the voltage shifter 12 in the first embodiment using another means. The resistor 32 and a value of the voltage Vc are adjusted such that the analog output current reaches the predetermined analog current value 18 shown in FIG. 2.

Specifically, a reverse voltage (−Vc) from the voltage source 31 is added to the divided voltage of the voltage dividing circuit (the resistors 15 and 16) and an added-up voltage is input to the other input terminal of the comparator 11. Therefore, the internal control voltage Va that is 0 volt in the analog output current range 19 shown in FIG. 2 and indicates a change in a rightward-rising linear track from 0 volt is applied.

Therefore, according to the sixth embodiment, as in the first embodiment, it is possible to generate the internal control voltage Va that crosses, at a maximum of the analog output current, the load end voltage Vb generated when the resistance $R_L$ of the connected load 3 is 300 ohms. In this sixth embodiment, an example of application to the second embodiment is explained. However, the sixth embodiment can also be applied to the first and third to fifth embodiments in the same manner.

Seventh Embodiment.

Figure 10:
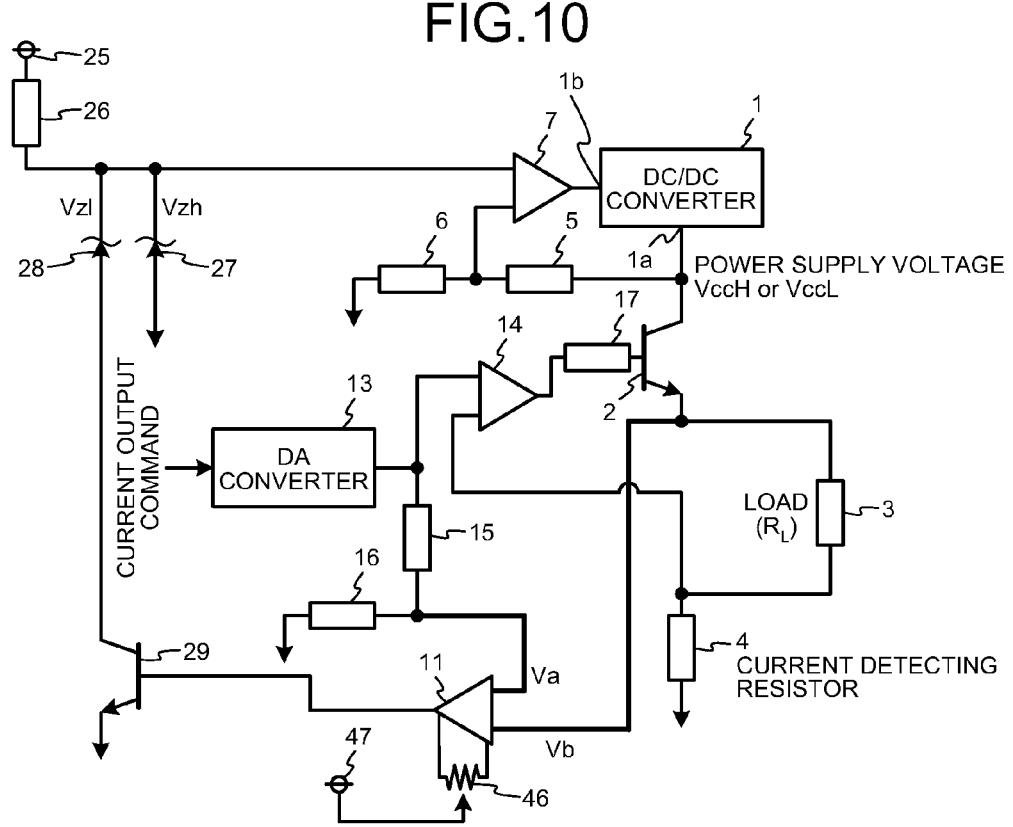
FIG. 10 is a block diagram of the configuration of an analog current output circuit according to a seventh embodiment of the present invention.

FIG. 10 is a block diagram of the configuration of an analog current output circuit according to a seventh embodiment of the present invention. In FIG. 10, components same as or equivalent to the components shown in FIG. 5 (the second embodiment) are denoted by the same reference numerals and signs. Sections related to this seventh embodiment are mainly explained below.

As shown in FIG. 10, in the analog current output circuit according to this seventh embodiment, in the configuration shown in FIG. 5 (the second embodiment), the comparator 11 has an offset adjusting function. The voltage shifter 12 in the internal control voltage generating circuit (the voltage dividing circuit formed by the resistors 15 and 16 and the voltage shifter 12) is deleted. A divided voltage of the voltage dividing circuit (the resistors 15 and 16) is directly applied to the other input terminal of the comparator 11.

An offset adjusting volume 46 connected to the power supply 47 is operated to adjust an offset voltage in a section of the analog output current range 19 shown in FIG. 2 to be equal to or smaller than 0 volt such that an offset volume is generated with respect to the divided voltage Va applied to the other input terminal in the comparator 11.

Consequently, the internal control voltage Va that is 0 volts in the analog output current range 19 shown in FIG. 2 and indicates a change of a rightward-rising linear track from 0 volt is applied to the other input terminal of the comparator 11. Therefore, the comparator 11 can correctly perform comparison and determination concerning whether a magnitude relation between the internal control voltage Va amd the load end voltage Vb is Va≤Vb or Va>Vb.

Therefore, according to the seventh embodiment, as in the first embodiment, it is possible to generate the internal control voltage Va that crosses, near a maximum of an output current, the load end voltage Vb generated when the resistance $R_L$ of the connected load 3 is 300 ohms. In this seventh embodiment, an example of application to the second embodiment can also be applied to the first and third to fifth embodiments in the same manner.

The analog current output circuit according to the present invention can be applied to, besides a sequence control system employing a PLC, a system that performs control using an analog output current such as an instrumentation system or a control system including a control computer. Therefore, although the electromagnetic valve is explained as an example of a load connected to the analog current output circuit in the first to seventh embodiments explained above, for example, a current input amplifier is also included as another load.

Industrial Applicability

As explained above, the analog current output circuit according to the present invention has a characteristic that the analog current output circuit can reduce a power loss and secure quick responsiveness when the resistance of a load connected to the analog current output circuit is small and, when the resistance of the connected load is large, can secure quick responsiveness, although a power loss is small from the beginning. Therefore, in particular, the analog current output circuit is useful as a high-speed analog current output circuit with a suppressed temperature rise and is suitable for a natural air cooling system.

The invention claimed is:

1. An analog current output circuit in which an output transistor and a load are connected in series between a power supply and a ground and that controls a passing current of the output transistor such that an analog output current to the load coincides with an output command current, wherein
    a voltage of the power supply is a first power supply voltage or a second power supply voltage lower than the first power supply voltage switched by a power supply voltage switching circuit,
    the power supply voltage switching circuit is configured to, according to a comparison result of a comparator that compares an internal control voltage and a load end voltage, select the first power supply voltage when the internal control voltage is smaller than the load end voltage and select the second power supply voltage when the internal control voltage is larger than the load end voltage, and
    the internal control voltage is generated by an internal control voltage generating circuit such that the internal control voltage is 0 volt from an analog output current 0 to a predetermined analog output current value and indicates a rightward-rising voltage track proportional to an electric current from the predetermined analog output current value to a maximum of the analog output current and crosses, at the maximum of the analog output current, a load end current generated when a resistance of the connected load is resistance near the center of a specification range.

2. The analog current output circuit according to claim 1, wherein the internal control voltage generating circuit includes:
    a voltage dividing circuit that divides a voltage corresponding to the output command current; and
    a voltage shifter that applies a fixed voltage shift to a divided voltage output from the voltage dividing circuit and outputs the internal control voltage.

3. The analog current output circuit according to claim 1, wherein the internal control voltage generating circuit includes:
    a voltage dividing circuit that divides a voltage corresponding to the output command current; and
    a voltage source that outputs a reverse-polarity voltage necessary for keeping a divided voltage output from the voltage dividing circuit at 0 volt in a period from the analog output current 0 to predetermined analog current value, and
    a voltage obtained by adding up the divided voltage and an output voltage of the voltage source is output as the internal control voltage.

4. The analog current output circuit according to claim 1, wherein
    the power supply is a DC/DC converter of a switching type that generates, based on a first reference voltage or a second reference voltage lower than the first reference voltage supplied to the power supply, the first power supply voltage and the second power supply voltage corresponding to the reference voltage, and
    the power supply voltage switching circuit includes:
        a first reference voltage source that outputs the first reference voltage;
        a second reference voltage source that outputs the second reference voltage; and
        a switching circuit that, according to the comparison result in the comparator, supplies the first reference voltage to the DC/DC converter when the internal control voltage is smaller than the load end voltage and supplies the second reference voltage to the DC/DC converter when the internal control voltage is larger than the load end voltage.

5. The analog current output circuit according to claim 1, wherein the power supply is a DC/DC converter of a switching type that generates, based on a first reference voltage or a second reference voltage lower than the first reference voltage supplied to the power supply, the first power supply voltage and the second power supply voltage corresponding to the reference voltage, and
    the power supply voltage switching circuit includes:
        a first zener diode that outputs the first reference voltage, a cathode terminal of the first zener diode being connected to a power supply of a predetermined voltage and the DC/DC converter and an anode terminal of the first zener diode being connected to the ground;
        a second zener diode that outputs the second reference voltage, a cathode terminal of the second zener diode being connected to the power supply of the predetermined voltage and the DC/DC converter; and
        a switching circuit that, as a result of the comparison in the comparator, when the internal control voltage is smaller than the load end voltage, interrupts connection between an anode terminal of the second zener diode and the ground and, when the internal control voltage is larger than the load end voltage, connects the anode terminal of the second zener diode and the ground.

6. The analog current output circuit according to claim 1, wherein
    the power supply is a DC/DC converter of a switching type that generates, based on a voltage of a reference voltage source incorporated in the DC/DC converter, the second power supply voltage and, when another reference voltage is input from an outside, adds the other reference voltage to the voltage of the incorporated reference voltage source to generate the first power supply voltage, and
    the power supply voltage switching circuit includes:
        a reference voltage source that outputs the other reference voltage; and
        a switching circuit that, according to the comparison result in the comparator, connects the reference voltage source to the DC/DC converter when the internal control voltage is smaller than the load end voltage and disconnects the reference voltage source from the DC/DC converter when the internal control voltage is larger than the load end voltage.

7. The analog current output circuit according to claim 1, wherein the power supply includes:

a first DC/DC converter of a switching type that generates, based on a voltage of a reference voltage source incorporated in the first DC/DC converter, the first power supply voltage; and a second DC/DC converter of the switching type that generates, based on a voltage of a reference voltage source incorporated in the second DC/DC converter, the second power supply voltage, and according to the comparison result in the comparator, the power supply voltage switching circuit supplies an output voltage of the first DC/DC converter to the output transistor when the internal control voltage is smaller than the load end voltage and supplies an output voltage of the second DC/DC converter to the output transistor when the internal control voltage is larger than the load end voltage.

8. The analog current output circuit according to claim 1, wherein the power supply includes:

a voltage source that outputs the first power supply voltage; and a DC/DC converter of a switching type that generates, based on a voltage of a reference voltage source incorporated in the DC/DC converter, the second power supply voltage, and the power supply voltage switching circuit includes a switching circuit that, according to the comparison result in the comparator, supplies an output voltage of the voltage source to the output transistor when the internal control voltage is smaller than the load end voltage and supplies an output voltage of the DC/DC converter to the output transistor when the internal control voltage is larger than the load end voltage.

9. The analog current output circuit according to claim 1, wherein a resistor that detects the analog output current is provided between an emitter of the output transistor and the load or between the load and the ground.

10. An analog current output circuit that generates a drive voltage and provides a desired analog current to an external load connected thereto, wherein the analog current output circuit provides the desired analog current to the external load by detecting a resistance value of the external load, and switches the drive voltage based on the detected resistance value, wherein the drive voltage is provided by one of a first voltage source which outputs a first voltage and a second voltage source which outputs a second voltage.

11. The analog current output circuit according to claim 10, wherein the drive voltage is generated by a DC/DC converter.

\* \* \* \* \*